United States Patent [19]

Stallings

[11] Patent Number: 5,630,446

[45] Date of Patent: May 20, 1997

[54] REPAIR APPARATUS FOR A GRAIN CHUTE

[76] Inventor: Richard D. Stallings, 305 S. Ivy, Yuma, Colo. 80759-2313

[21] Appl. No.: 538,906

[22] Filed: Oct. 4, 1995

[51] Int. Cl.$^6$ .................................................. F16L 55/16
[52] U.S. Cl. .............................................. 138/99; 138/97
[58] Field of Search ..................... 138/97, 99; 156/287; 264/269, 36

[56] References Cited

U.S. PATENT DOCUMENTS

| | | |
|---|---|---|
| 64,285 | 4/1867 | Collins . |
| 629,315 | 7/1899 | Dorticus . |
| 962,566 | 6/1910 | Gerth . |
| 1,027,155 | 5/1912 | Robbins . |
| 1,032,078 | 7/1912 | Osborn . |
| 1,946,760 | 2/1934 | Rhine . |
| 3,502,112 | 3/1970 | Hankila ........................ 138/99 |
| 3,807,540 | 4/1974 | Boulet ........................... 193/9 |
| 3,833,267 | 9/1974 | McCumber .................... 302/64 |
| 4,535,822 | 8/1985 | Rogers, Jr. .................... 138/99 |
| 4,645,055 | 2/1987 | Griese et al. ................ 193/2 R |
| 4,702,364 | 10/1987 | Johanneck ................... 193/22 |
| 4,711,334 | 12/1987 | Barry et al. .................... 193/6 |
| 5,437,489 | 8/1995 | Sanders et al. ............ 138/99 X |

*Primary Examiner*—Patrick Brinson
*Attorney, Agent, or Firm*—Sheridan Ross P.C.

[57] ABSTRACT

An apparatus and method are described for repairing a hole in a grain transmission pipe. The device can be remotely positioned and secured around the hole in the grain transmission pipe by one person without the use of a crane or other heavy equipment, and may utilize a design where the frictional resistance of the grain is directed against other grain, and not components of the apparatus.

18 Claims, 4 Drawing Sheets

REPAIR APPARATUS FOR A GRAIN CHUTE

FIELD OF THE INVENTION

The invention relates to an apparatus and method for repairing a hole in a grain transmission pipe. The invention further relates to an apparatus and method which allows one person to manually install the apparatus to the grain pipe from a remote location without the need of expensive support equipment such as a crane or other heavy machinery.

BACKGROUND OF THE INVENTION

In the farming and grain industry, once grain such as corn or wheat is harvested in the field, it is frequently transported to a central gathering location commonly known as a grain elevator. The grain elevator complex generally has a vertical transport leg which transports grain from approximately ground level to a distributor, which feeds one or more gravity down chutes. The down chutes deliver the grain to a predetermined storage bin which holds the grain until transportation to a mill or other destination. During storage operations, millions of bushels of grain are transported through the down chutes. As a result of the significant friction generated between individual grain kernels and the grain chutes, holes eventually develop, causing grain to fall to the ground and be ruined or disrupt grain elevator operations.

Due to the elevated location of the grain chutes, it is impractical to attempt to repair the holes without the assistance of a crane or other similar expensive lift equipment to elevate a worker to the elevation of the hole in the grain chute. Furthermore, due to the often remote rural locations of grain elevators, and lack of crane availability, it may be days or weeks before equipment can become available to adequately repair a grain chute. These delays may prevent the immediate storage of harvested grain and the likelihood of waste or damage to the grain, thus causing significant expense.

Furthermore, current repair apparatus such as rubber, plastic and metallic patches which are tied, strapped or welded to the grain chutes around the hole are time consuming to install, expensive, and generally inefficient. Thus, a problem exists in the grain storage industry to provide an apparatus for quickly and efficiently repairing grain chutes and other types of grain transmission pipe, and which is constructed in a manner to prevent reoccurring holes and the need for subsequent repairs. Furthermore, a need exists to provide an apparatus for repairing a hole in grain pipe which can be positioned and actuated by one person from a remote location, without the assistance of a crane or other heavy lift equipment.

SUMMARY OF THE INVENTION

The invention relates to an apparatus and method for repairing a hole in grain transmission pipe, primarily at elevated and remote locations. It is an object of the invention to provide an apparatus for repairing a hole in an elevated grain chute without the need for a crane or other expensive lift equipment. It is a further object of the invention to provide an apparatus which may be installed around a grain pipe quickly and efficiently by one persons to minimize downtime while repairing a hole in the grain pipe. It is an additional object of the invention to provide a repair apparatus which is inexpensive to manufacture, is durable and resistant to developing holes as a result of moving grain.

One aspect of the invention includes a sleeve assembly having a bottom portion pivotally interconnected to at least one top member and a locking assembly to securely hold the apparatus around a grain transmission pipe. All, or a portion of the sleeve assembly may be comprised of a flexible material such as plastic to allow sufficient concentric deflection to permit the sleeve assembly to be easily positioned around the grain transmission pipe.

It is a another aspect of the invention that the bottom portion of the sleeve assembly may include a pan portion with sufficient volume to fill with kernels of grain. This pan portion allows the moving grain in the transmission pipe to frictionally engage other kernels of grain located in the pan, and therefore reduce frictional wear against the patch material. In one embodiment, the sleeve assembly may include a compressible contact material on the outer perimeter rims to sealingly engage the grain transmission pipe, thus preventing any grain spillage around the ends of the sleeve assembly.

In yet another aspect of the invention, the sleeve assembly is provided with a interconnected locking means to immobilize the sleeve assembly around the grain transmission pipe. The locking means may be one or more bolts and companion nuts, a clamping mechanism, or plurality of clamps interconnected with one or more anchor flanges to the sleeve assembly. In one embodiment, the locking assembly includes an adjustment means which allows the diameter of the sleeve assembly to be quickly modified to assure a proper fit of the sleeve assembly around the grain transmission pipe. One particular type of adjustment means includes an adjustment member with a bore sized to receive a threaded end of a clamping arm. To adjust the length of the clamping arm, and corresponding size of the sleeve assembly, the adjustment member is positioned to a desired location on the clamping arm and tightened in place by an adjustment nut sized to fit the end of the threaded clamping arm.

It is a further aspect of the invention that the apparatus include a remote actuating means to allow one person to install the device without a crane or other type of heavy lift equipment. The remote actuating means is generally comprised of a positioning rope and an actuation tether interconnected to the sleeve assembly and locking apparatus, respectively. In a travelling position, the sleeve assembly has a sufficient internal diameter to allow the sleeve assembly to slide along the grain transmission pipe until it is positioned over a hole in the pipe grain. Thus, the sleeve assembly may be positioned into place with the positioning rope. Once the proper location of the sleeve assembly is obtained, the locking assembly is actuated by the operator pulling the actuation tether, thus tightening the sleeve assembly around the grain pipe.

In another aspect of the invention, a remote disconnect assembly may be interconnected to the sleeve assembly and operated in conjunction with the remote actuating assembly. Thus, when the operator pulls the actuation tether to secure the sleeve assembly around the grain pipe, the remote disconnect assembly releases most of the remote actuating hardware, positioning rope and actuation tether from the sleeve assembly. Thus, after installation on the grain pipe, the sleeve assembly is left in place around the grain transmission pipe without any ancillary ropes or installation hardware dangling from the sleeve assembly in an obstructive manner.

One further aspect of the invention is to provide a method for remotely positioning and clamping the repair apparatus over a hole in elevated grain pipe. In one embodiment, a method for releasing the required ropes and appurtenant hardware from the sleeve assembly is provided to prevent any type of hanging obstructions.

These and other objects and advantages will become readily apparent from the following detailed description of the invention and from the attached drawings.

DETAILED DESCRIPTION OF THE PREFERRED EMBODIMENT

Figure 1:
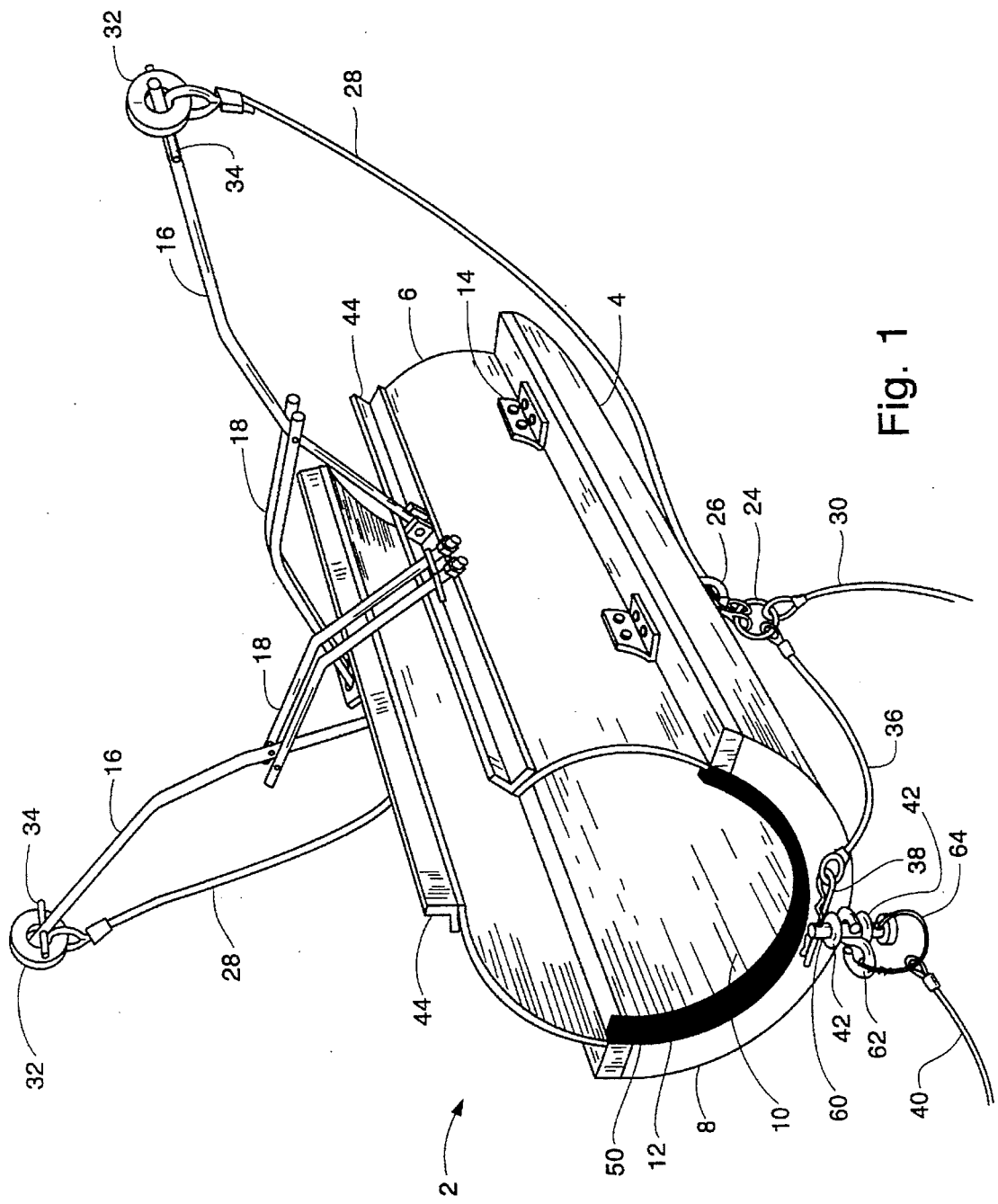
FIG. 1 is a perspective view of the grain chute repair apparatus showing one embodiment of the invention.

The invention in its broader aspects relates to an apparatus and method for efficiently and economically repairing a hole in a grain chute or other type of grain transmission pipe commonly found at grain elevator locations. The device may additionally be used at locations where holes develop in pipe or other conduit used to transport grain, such as flour mills, shipping docks, etc. Furthermore, the apparatus may be used with or without a remote actuation assembly, which allows the apparatus to be positioned and secured in place over a hole in grain transmission pipe from a remote, often elevated location without the assistance of a crane or other heavy lift equipment. Furthermore, the apparatus may be installed by one person, and the ropes and other positioning and securing apparatus disconnected with a remote disconnection assembly to prevent any type of obstruction near the ground once positioning and installation is complete.

The grain chute repair apparatus is preferably comprised of a sleeve assembly having a bottom portion interconnected to at least one top portion. The top portion is preferably pivotally interconnected on one edge to the bottom portion by a hinge or plurality of hinges to allow the top portion to pivot outwardly and away from the sleeve assembly, allowing the sleeve assembly to be positioned around the grain pipe. Although the top and bottom portions of the sleeve assembly may be comprised of wood, metal, or fiberglass, preferably the top and bottom portions are made of durable plastic materials. The plastic materials, and particularly the top portion of the sleeve assembly, are preferably flexible enough to allow the sleeve assembly to be concentrically deflected to allow the sleeve assembly to be more easily positioned over the grain pipe, and may potentially eliminate the need for hinges or other pivotal attachment devices between the top members and bottom members. More preferably, the repair apparatus is comprised of a bottom portion and two opposing top members pivotally connected on one edge to the bottom member, thus allowing the two top members to be pivoted in a direction away from the sleeve to receive the grain pipe.

The bottom portion of the sleeve assembly may include a pan portion defined by two opposing rims located on or near the ends of the bottom portion of the sleeve assembly. The pan portion is hollow, and has a depth of at least about 1 inch, and preferably about 1.75 inches, which eventually fills with grain after the sleeve is positioned and secured around the hole in the grain pipe. The pan portion, once filled with grain, helps prevent holes from reoccurring in the repair apparatus or in the grain transmission pipe as a result of the moving kernels of grain contacting the grain in the pan portion. In operation, the moving kernels of grain in the grain transmission pipe are continually rubbing against stationary grain kernels located inside the pan portion of the sleeve, and not against the sleeve materials of the repair apparatus.

The rims which define the bottom portion of the sleeve assembly, including the pan portion if used, may be coated with, or have an attached compressible material for contact with the grain transmission pipe. When the aforementioned remote actuation assembly is utilized with the repair apparatus, preferably the top member(s) do not include any compressible sealing material since this material may inhibit the ability of the sleeve assembly to slide along the grain transmission pipe.

Referring now to the drawings, FIG. 1 is a perspective view of the grain pipe repair apparatus showing the sleeve assembly 2 comprised of a bottom member 4 interconnected to two top members 6. Preferably, the top members 6 are pivotally interconnected on one edge to the bottom member 4 by hinges 14, which allow the top members 6 to pivot outward and away from the bottom member 4. The pivoting motion allows the top members 6 to be sufficiently separated to allow the entire sleeve assembly 2 to be positioned around a grain transmission pipe. The pan portion 10 is defined by a pair of opposing rims 8 located at or near the ends of the sleeve assembly 2. The rims are at least about 1–3 inches in depth, and more preferably about 1.75 inches in depth to allow grain to accumulate within the pan portion of the sleeve assembly 2. Additionally, the rims may be arcuate in shape with an interval diameter which is slightly larger than the grain pipe on which the sleeve assembly is to be installed.

The rim interior surface 50 which contact the grain pipe 58 may be made of a material which is compressible. This may be accomplished by gluing, taping or affixing a soft foam rubber material preferably between about $\frac{1}{8}$" and $\frac{1}{2}$" in depth and $\frac{1}{4}$"–2" in width to the arcuate rim interior surface 50. In one embodiment, the compressible material is about $\frac{1}{2}$ inches thick and has a width approximately the same width as the rim which contacts the grain pipe 58. Weather stripping products such as door weather stripping which have a preattached adhesive surface or other similar materials may be utilized as a compressible material.

The sleeve assembly 2 has an interconnecting locking assembly which has both a traveling position and a locking position. In the traveling position, the sleeve assembly 2 may be opened sufficiently to allow the positioning and sliding of the sleeve assembly around the grain transmission pipe 58. In a securing position, the sleeve assembly 2 is immobilized around the grain pipe and any holes in the grain pipe to prevent the spillage of grain.

To secure the sleeve assembly around the grain pipe the top member 6 has an anchor flange 44 attached near the non-pivoting edge of the top member 6. The anchor flange 44 may be comprised of rigid plastic, fiberglass or a metal of sufficient strength to hold a clamp, bolt or other type of securing hardware. The anchor flange 44 may be attached to the top member 6 with screws, pins, adhesives or other means commonly known in the art. In one embodiment, the anchor flange has an upturned end piece to allow the sleeve assembly to slide over obstructing welds or bolts at seam locations in the grain chute. Additionally, the anchor flange 44 may have one or a plurality of bolt holes 52 of sufficient diameter to receive a flange bolt 46, which is threaded for attachment of a flange bolt tightening nut 54. Where only one top member is utilized, a nail, screw, or bolt and nut assembly may be positioned through the bolt holes of the anchor flange 44 and penetrate into the bottom member for the purpose of securing the sleeve assembly 2 around the grain pipe.

When two top members 6 are pivotally interconnected to the bottom member 4, as opposed to utilizing only one top member, each of the non-pivoting edges of the top members may have anchor flanges 44 attached. In one embodiment, each of the anchor flanges 44 may have opposing flange bolt holes 52 to allow the passage of a flange bolt(s) 46. In this manner the tightening nuts 54 may be tightened on the flange bolts to immobilize the sleeve assembly 2 around the grain pipe 58.

Alternatively, the locking device used to secure the sleeve assembly may be comprised of at least one clamping arm pivotally interconnected to at least one anchor flange 44. opposing anchor flange 44 may be interconnected to the bottom member 4 of the sleeve assembly 2 if only one top member 6 is used. In another embodiment, however, a pair of top members 6 are utilized and a clamping arm assembly is pivotally interconnected to an opposing anchor flange 44 which is attached to the non-pivoting edge of each top member 6.

To provide securement of the opposing top member 6 to the bottom member 4, or opposing top members if two top members 6 are utilized, a first clamping arm 16 is pivotally interconnected to the anchor flange 44. A second clamping arm 18 is pivotally interconnected to the first clamping arm 16 on a first end, while a second end of the second clamping arm 18 extends across an interface opening defined by the non-pivoting edges of the top members 6. The second end of the second clamping arm 18 is removably interconnected to the opposing anchor flange 44 to allow the sleeve assembly to be secured around the grain pipe when the first clamping arm is pushed downward toward the sleeve assembly. Although one clamping arm assembly may be sufficient to secure the sleeve assembly 2 around the grain pipe, preferably two clamping assemblies are utilized, as seen in FIG. 1. For additional strength, two substantially parallel second clamping arms 18 may be pivotally interconnected to the first clamping arm 16, rather than only one second clamping arm 18.

Furthermore, an adjustment mechanism may be provided which allows the modification of the length of the clamping arms, and thus the size of the sleeve assembly 2. The adjustment mechanism may be used to alter the size of the sleeve assembly in both the traveling and securing positions. One particular embodiment includes an adjustment member 20 comprised of a substantially flat plate having at least two bore holes. The flat plate is approximately 0.5 inch by 1 inch in dimension. The first bore hole is sized to receive the second end of the second clamping arm 18, while the second bore hole is sized to receive an alignment pin 48 extending from the anchor flange 44. In operation, the adjustment member 20 is positioned to receive the alignment pin 48 while the second end of the second clamping arm 18 is received through the adjustment member second bore hole 56. The second end of the second clamping arm is preferably threaded to accept an adjustment nut 22, which can be either tightened or loosened to quickly change the dimensions of the sleeve assembly. Thus, the adjustment member 20 can be used to optimize the degree of tightness applied by the locking assembly. Furthermore, the adjustment member 20 can be used to adjust the sleeve assembly 2 to a sufficient dimension to allow the sleeve assembly 2 to be positioned on or slid over the hole in the grain pipe while the locking assembly is in a travelling position.

To allow the locking means of the sleeve assembly to be remotely actuated without the use of a crane or other type of heavy lift equipment, a remote actuating assembly may be attached to the sleeve assembly 2. The remote actuating assembly is comprised of a positioning rope 40 and a guide twine 28 having a first end and a second end. The first end of the guide twine 28 is interconnected to a first clamping arm 16 and the second end attached to a stop ring 24. As an additional component of the remote actuating assembly, the stop ring 24 has a external diameter greater than the internal diameter of a guide ring 24, which is interconnected to the bottom member at a location substantially below the clamping arm assembly. The stop ring 24 is further interconnected to an actuation tether, which is held by the operator installing the sleeve assembly. The actuation tether may be comprised of rope, plastic, wire, or any other suitable material with a diameter between 0.25–0.75 inch and a length of at least about 2.5 feet.

In operation, when the sleeve assembly is properly positioned over the hole in the grain pipe with the positioning rope 40, the operator pulls the actuation tether 30, which applies tension to the guide twine 28. When sufficient tension is applied to the guide twine 28, force is applied downward on the first clamping arm 16 towards the guide ring 26, moving the first clamping arm from the traveling position to the securing position.

Figure 2:
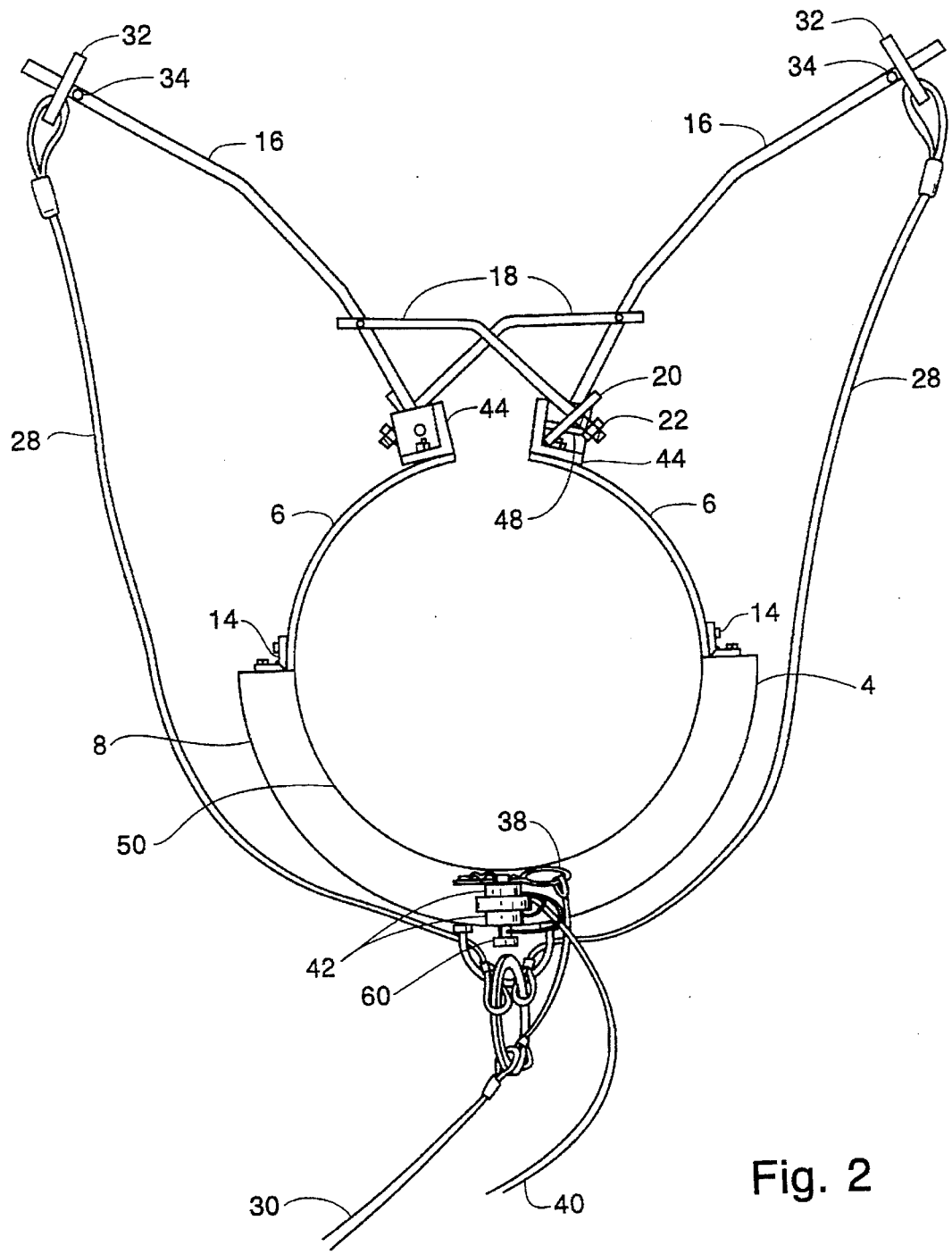
FIG. 2 is an end view of the grain chute repair apparatus showing the sleeve assembly, clamping arms, actuation and release assemblies in one embodiment of the invention.

The remote actuating assembly may include a holding pin 34 interconnected to the first end of the first clamping arm 16. A release washer 32 is interconnected to the first end of the guide twine 28 and is sized to be slidingly positioned over the first end of the first clamping arm 16, yet sized to prevent travel past the holding pin 34. The holding pin may be a nail, cotter pin, roll pin or other similar device which can be securely held in position on the first clamping arm 16. As seen in FIG. 2, when the sleeve assembly is in the travelling position, the first clamping arms 16 are pointed upward and away from the sleeve assembly 2, thus preventing the release washer 32 from inadvertently falling from the first clamping arm 16 as a result of gravity. When tension is applied to the first clamping arm 16 from the guide twine 28, the first clamping arm 16 moves downward toward the sleeve assembly 2, and the release washer 32 slides off the first clamping arm 16, thus releasing the guide twine 28 from the first clamping arm 16 and locking the sleeve assembly 2 in place around the grain pipe 58.

Figure 3:
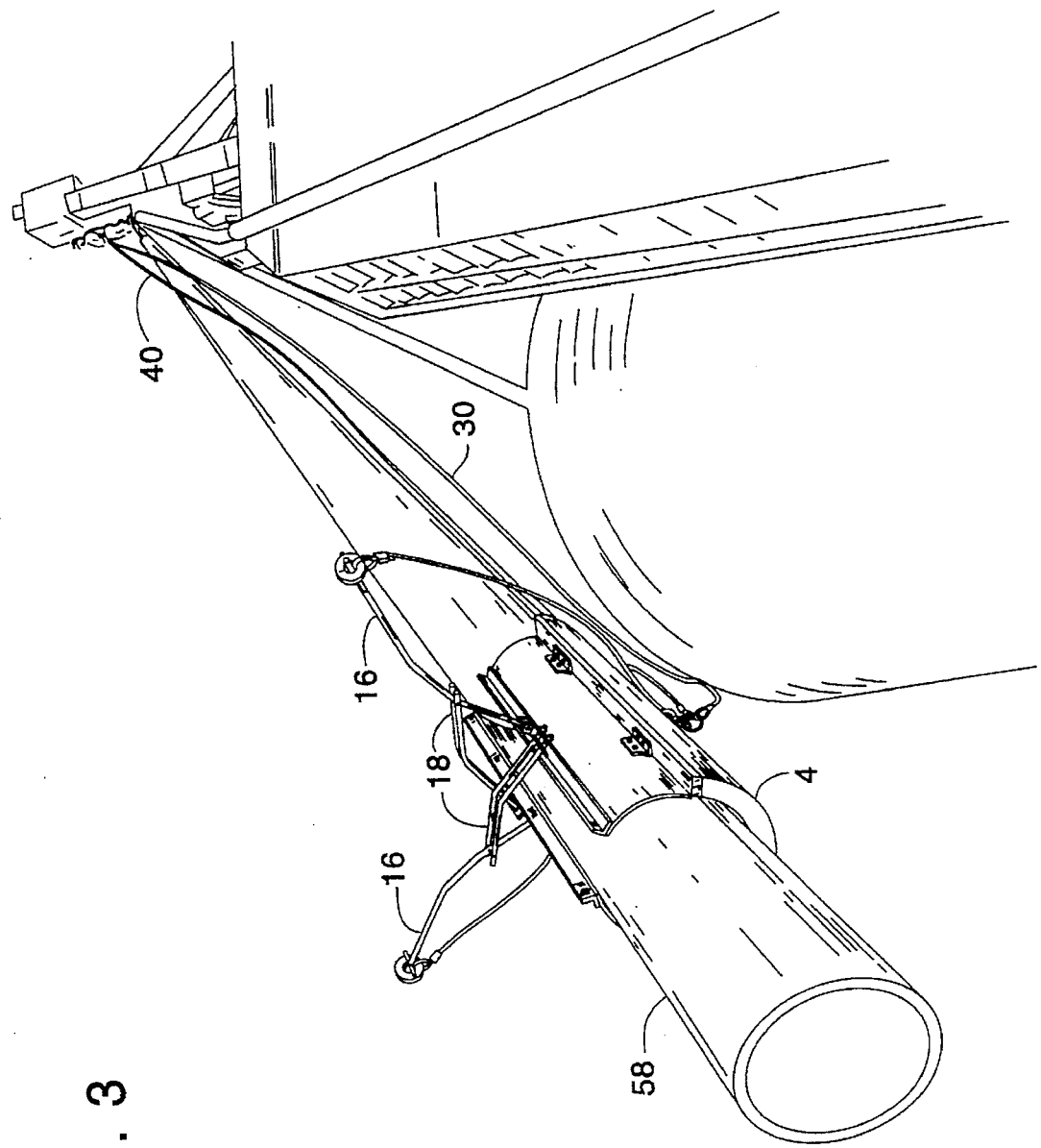
FIG. 3 is a perspective view showing the grain repair apparatus being lowered into position over a hole in a grain chute.
Figure 4:
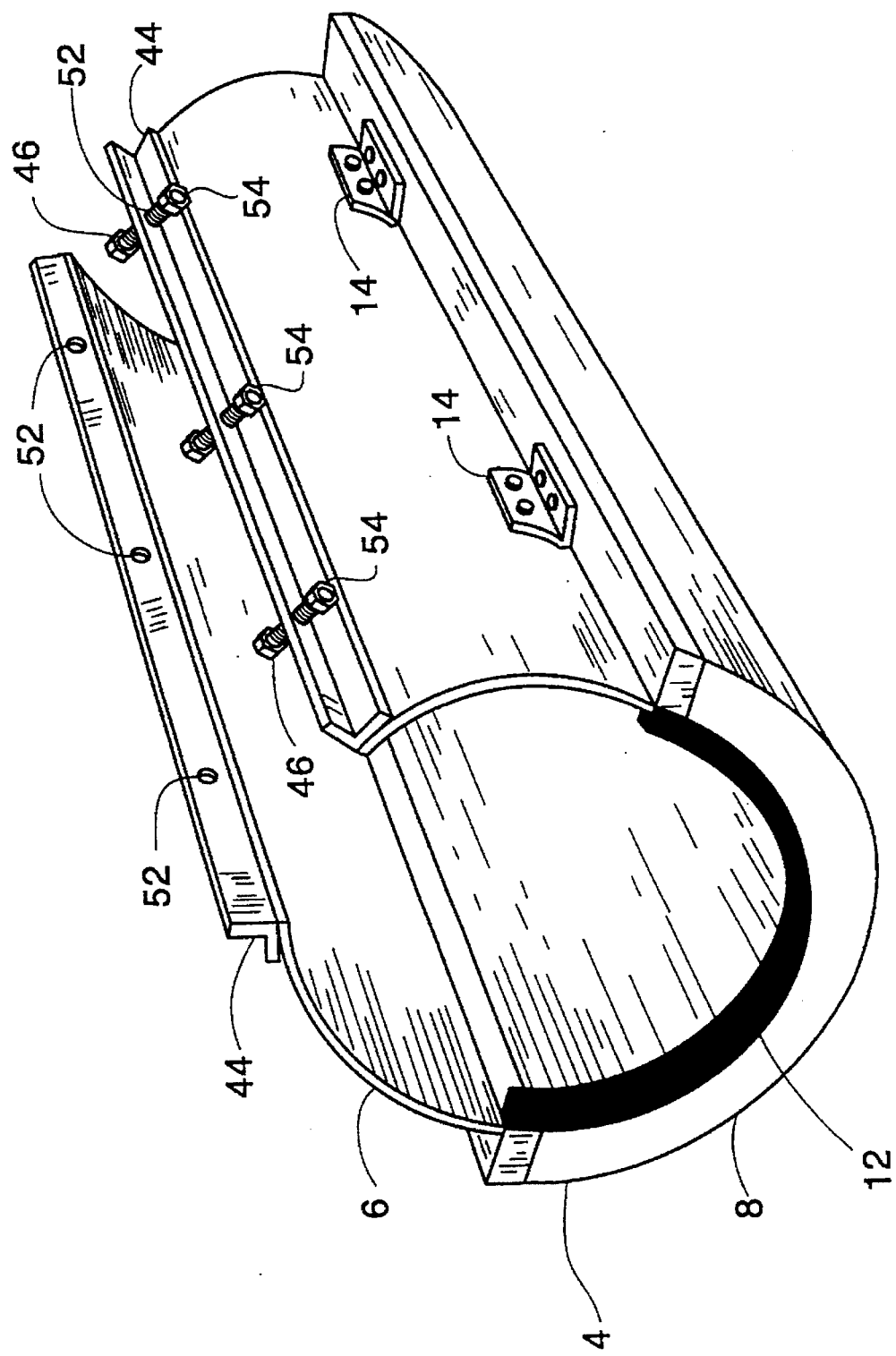
FIG. 4 is a perspective view of the grain repair apparatus showing an alternative locking mechanism.

A remote disconnect assembly may additionally be provided to permit the release of the positioning rope 40, actuation tether 30, guide twine 28 and appurtenant hardware used to position and secure the sleeve assembly 2 around a hole in the grain transmission pipe 58. Referring to FIG. 3, the remote actuation and disconnect assembly may be seen in use as an operator lowers the sliding sleeve 2 over a hole in a grain transmission pipe 58 without the use of a lift crane or other heavy equipment.

As seen in FIGS. 1 and 2, the remote disconnect assembly is comprised of an interconnection chord 36 having a first end interconnected to the stop ring 24, and a second end interconnected to a disengagement pin 38. The interconnection chord may be comprised of rope, twine, plastic, leather, wire or any other suitable material, and is preferably 1/8–1/2 inch in diameter with a length of approximately 1.5 feet. The disengagement pin 38 may be a metal cotter pin approximately 1.5 inches long, and is removably interconnected to the non-head end of a release bolt 60 which is part of an S-hook assembly.

The S-hook assembly is interconnected to one end of the sleeve assembly 2, on the bottom end and may be interconnected to one of the rims 8 which defines the pan. The S-hook assembly is comprised of a pair of opposing eye bolts 42 which are screwed or otherwise interconnected to the rims 8 of the bottom member 4 of the sleeve assembly 2. A release bolt 60 extends upward through the pair of opposing eye bolts 42, the release bolt 60 having a head portion on a lower end with a diameter greater than the internal diameter of the eye bolts 42, and an upper end releasably interconnectable to the disengagement pin 38. The release bolt may be metallic, durable plastic or other materials known in the art with a diameter of at least about ⅛ inches and a length of at least about 1–3 inches.

An S-hook 62 is interconnected to the release bolt by means of a first end being interposed around the release bolt between the first and second eye bolts 42. The second end of the S-hook 62 extends away from the release bolt at a substantially 90° angle and has a hook end for attachment of a positioning rope and a release wire 64.

The release wire 64 has a first end and a second end, the first end interconnected to the second end of the S-hook 62 and the second end of the release wire 64 interconnected to the head end of the release bolt 60. The release wire 64 is used to retrieve the release bolt 60 by interconnecting the release bolt to the second end of the S-hook assembly 62. The second end of the release wire 64 may be interconnected to the head end of the release bolt 60 by drilling a hole through the release bolt 60 and running the release wire 64 through the hole and back around to the release wire 60, where a secure knot is made. However, as may be appreciated by one skilled in the art, any method of attaching the release wire 60 to the second end of the S-hook 62 and head end of the release bolt 60 may be utilized.

As a final component of the remote disconnect assembly, a positioning rope 40 is interconnected to the second end of the S-hook 62. The release rope may be made of twine, rope, cable or other suitable material with dimensions of ⅛ to ¾ inches in diameter and a minimum length of at least about 40 feet, although the required length is dictated by the location of the hole in the grain pipe.

In use, the sleeve assembly 2 of the grain repair apparatus is placed over the grain pipe and the size of the sleeve adjusted with the adjustment member 20 and adjustment nut 22 to permit the sleeve to freely slide along the grain pipe 58. The positioning rope 40 is then used to lower or pull the sleeve assembly along the grain pipe 58 until the sleeve assembly is positioned over the hole in the grain pipe 58. The actuation tether 30, which has been held by the operator, is now pulled by the operator, which directs force downward with the guide twine 28 in a direction towards the guide ring 26. The force from the guide twine 28 pulls the first clamp arm downward and secures the sleeve assembly around the grain pipe 58. As the clamping assembly is lowered past a certain point assuring downward travel, the release washers 32 fall from the first clamping arms and are pulled through the guide ring 26. As continued tension is applied by the actuation tether 30, tension is applied to the interconnection chord 36 and attached disengagement pin 38, which is pulled from the release bolt 60. As the disengagement pin 38 is disconnected from the release bolt 60, gravity permits the release bolt 60 to travel through the pair of opposing eye bolts 42, releasing the S-hook 62. With the release of the S-hook 62, the positioning rope 40, interconnection chord 36, actuation tether 30, guide twine 28, release washer 32, release bolt 60, disengagement pin 38 and release wire 64 all become detached from the sleeve assembly and may be retrieved, preventing any hanging obstructions from the grain transmission pipe.

Furthermore, a method is provided for repairing a hole in a grain transmission pipe by first positioning a sleeve assembly 2 around the grain pipe 58, utilizing the pivoting top members 6 interconnected to the bottom member 4 of the sleeve assembly. Secondly, at least one actuation tether 30 is attached to a locking assembly interconnected to the sleeve assembly, the locking assembly having a travelling and a securing position. A positioning rope 40 is then attached to a remote disconnect assembly and the sleeve assembly 2 is slid along the grain pipe 58 until the sleeve assembly is transposed over the hole in the grain pipe 58. Once properly positioned, an operator pulls the actuation tether 30 to actuate the locking assembly from a travelling position to a securing position to immobilize the sleeve assembly around the hole in the grain pipe 58. Finally, by continuing to pull the actuation tether 36, the positioning rope 40, actuation tether 30 the interconnecting remote actuating assembly can be released from the sleeve assembly to prevent any hanging obstructions from the sleeve assembly 2.

For reference purposes, the following is a detailed list of the described components of the repair apparatus for a grain chute, and corresponding numbers as shown in the drawings:

| Number | Component |
| --- | --- |
| 02 | sleeve assembly |
| 04 | bottom member |
| 06 | top member |
| 08 | rims |
| 10 | pan portion |
| 12 | compressible contact member |
| 14 | hinge |
| 16 | first clamping arm |
| 18 | second clamping arm |
| 20 | adjustment member |
| 22 | adjustment nut |
| 24 | stop ring |
| 26 | guide ring |
| 28 | guide twine |
| 30 | actuation tether |
| 32 | release washer |
| 34 | holding pin |
| 36 | interconnection chord |
| 38 | disengagement pin |
| 40 | positioning rope |
| 42 | eye bolts |
| 44 | anchor flange |
| 46 | flange bolt |
| 48 | alignment pin |
| 50 | arcuate rims interior surface |
| 52 | flange bolt hole |
| 54 | flange bolt tightening nut |
| 56 | adjustment member bore hole |
| 58 | grain pipe |
| 60 | release bolt |
| 62 | S-hook |
| 64 | release wire |

The foregoing description of the present invention has been presented for purposes of illustration and description. The description is not intended to limit the invention to the form disclosed herein. Consequently, the invention modification commensurate with the above teachings and skill and knowledge of the relevant art are within the scope of the present invention. The preferred embodiment described above is also intended to explain the best mode known of practicing the invention and to enable others skilled in the art to utilize the invention in various embodiments with the various modifications required by their particular applications for use of the invention. It is intended that the appended claims be construed to include all alternative embodiments as permitted by the prior art.

What is claimed is:

1. A remotely actuated repair apparatus for grain pipe, comprising:
   a sleeve assembly with a bottom member and at least one top member pivotally connected to said bottom member;
   locking means permanently interconnected during use on two members of said sleeve assembly, said locking means having a travelling position and a securing position; and
   means for remotely manually actuating said locking means, wherein in said travelling position said sleeve assembly is slidingly positionable over a hole in said grain pipe, and when said locking means with an actuation tether is in said securing position said sleeve assembly is immobilized around said hole in said grain pipe.

2. The repair apparatus of claim 1, wherein at least a portion of said sleeve assembly is comprised of a material flexible enough to allow sufficient concentric deflection to manually position said sleeve assembly around said grain pipe.

3. The repair apparatus of claim 1, wherein said locking means further comprises an adjustment means for modifying the concentric dimension of said sleeve assembly.

4. The repair apparatus of claim 1, wherein said bottom member comprises a pan shaped portion defined by two opposing rims for engaging said grain pipe.

5. The repair apparatus of claim 4, wherein the opposing rims of said bottom member have a compressible contact material for sealingly engaging said grain pipe.

6. The repair apparatus of claim 1, wherein said bottom member and said top members are pivotally connected with at least one hinge.

7. The repair apparatus of claim 1, wherein said locking means comprises:
   an opposing pair of anchor flanges interconnected to said sleeve assembly;
   at least one clamping arm pivotally interconnected to at least one of said anchor flanges; and
   an interconnecting adjustment member for attaching said clamping arm to the opposing anchor flange, wherein when said clamping arm is moved from said travelling position to said securing position, said sleeve assembly is immobilized around said grain pipe.

8. The locking means of claim 7, wherein said clamping arm comprises:
   a first clamping arm pivotally interconnected to said first anchor flange and extending away from an interface opening between said bottom member and said top member of sleeve assembly; and
   at least one second clamping arm having a first end pivotally interconnected to said first clamping arm and a second end extending across said interface opening and interconnected to said interconnecting adjustment member.

9. The locking means of claim 8, wherein said second end of said second clamping arm is threaded for accepting an adjustment nut, wherein said interconnecting adjustment member may be reciprocated along said second clamping arm to adjust the length of said second clamping arm and the size of said sleeve assembly.

10. The locking means of claim 8, wherein said first and said second clamping arms are bent downwards away from said interface opening and toward said sleeve assembly to facilitate said locking means.

11. The repair apparatus of claim 1, wherein said means for remotely actuating said locking means comprises:
    at least one guide twine having a first end and a second end, said first end interconnected to a first clamping arm of said locking means; and
    a guide ring interconnected to said bottom member of said sleeve assembly at a position operatively below said first clamping arm, wherein when tension is applied to said second end of said guide twine, force is applied to said clamping arm in a direction towards said guide ring, moving said first clamping arm from said travelling position to said securing position.

12. The repair apparatus of claim 11, wherein said means for remotely actuating said locking means further comprises:
    a holding pin interconnected to a first end of said first clamping arm, said first end extending upward and away from said sleeve assembly when said locking means is in a travelling position; and
    a release washer interconnected to said first end of said guide twine, said release washer sized to be slidingly positioned over said first end of said first clamping arm yet sized to prevent travel past said holding pin, wherein when said first clamp arm is moved from said first travelling position to a second securing position, said release washer and said guide twine is disconnected from said first clamp arm.

13. The repair apparatus of claim 1, further comprising a remote disconnect assembly, comprising:
    an interconnection cord having a first end interconnected to an actuation tether and a second end interconnected to a disengagement pin;
    an S-hook assembly comprising:
      a) a pair of opposing eye bolts interconnected to said bottom member of said sleeve assembly;
      b) a release bolt extending upward through said pair of opposing eye bolts, said release bolt having a head on a lower end with a diameter greater than an internal diameter of said eye bolts, and an upper end releasably interconnectable to said disengagement pin;
      c) an S-hook with a first end and a second end, said first end interposed around said release bolt between said first eye bolt and said second eye bolt and said second end extending away from said release bolt;
      d) a release wire having a first end and a second end, said first end interconnected to said second end of said S-hook, and said second end interconnected in close proximity to said head of said release bolt; and
      e) a positioning rope interconnected to said second end of said S-hook, wherein when said first end of said interconnection cord is pulled, said disengagement pin is released from said release bolt, permitting said release bolt to travel through said pair of opposing eye bolts and said S-hook assembly, releasing said positioning rope, S-hook, release wire, release bolt, disengagement pin and interconnection cord from said sleeve assembly.

14. A repair apparatus for repairing a hole in a grain pipe, comprising:
    a sleeve assembly having a bottom member pivotally connected to at least one top member, said bottom and said top members having contact surfaces for concentrically engaging said grain pipe on either side of said hole and said bottom member comprising a pan portion for holding grain that has fallen through said hole, said pan portion defined by a pair of rims for concentrically engaging said grain pipe; and a locking means interconnectable to said sleeve assembly with at least one anchoring flange, wherein when said sleeve assembly is positioned over said hole in said grain pipe said sleeve assembly is immobilized around said pipe with said locking means.

15. The repair apparatus of claim 14, wherein said locking means comprises at least one bolt interconnected to said anchoring flange and a tightening nut interconnected to said bolt.

16. The repair apparatus of claim 14, wherein at least a portion of said sleeve assembly is comprised of a material flexible enough to allow sufficient concentric deflection to manually position said sleeve assembly around said grain pipe.

17. A method for repairing a hole in a grain pipe from a remote location, comprising the steps of:

positioning a sleeve assembly around said grain pipe, said concentric sleeve assembly comprising a bottom portion pivotally connected to at least one top portion;

attaching at least one actuation tether to a locking means connected to said sleeve assembly, said locking means having at least a travelling position and a securing position;

attaching a positioning rope to a remote disconnect assembly interconnected to said sleeve assembly;

sliding said sleeve assembly along said grain pipe with said positioning rope until said sleeve assembly is transposed over said hole in said grain pipe;

pulling said actuation tether to actuate said locking means from a travelling position to a securing position to immobilize said sleeve assembly around said hole in said grain pipe; and retrieving said actuation tether to disconnect said positioning rope and said actuation tether from said sleeve assembly.

18. A remotely actuated repair apparatus for grain pipe, comprising:

a sleeve assembly with a first top member and a second top member pivotally interconnected to a bottom member, said bottom member having a pan-shaped portion defined by two opposing rims for concentrically engaging said grain pipe;

a first anchor flange interconnected to said first top member and a second anchor flange interconnected to said second top member;

a pair of first clamping arms with a first end and a second end, said first end of one of said clamping arms pivotally interconnected to said first anchor flange and said other first end of said other first clamping arm pivotally interconnected to said second anchor flange, said second ends of said first clamping arms extending away from an interface opening located between said first and said second anchor flanges;

a holding pin interconnected to said second ends of each of said first clamping arms;

a pair of second clamping arms with a first end pivotally interconnected to each of said first clamping arms and a second end extending across said interface opening and adjustably connected to a interconnecting adjustment member, said adjustment member having a bore for receiving an alignment pin projecting from each of said first and said second anchor flanges;

a remote actuating assembly comprising a guide ring interconnected to the bottom member of said sleeve assembly below said clamping arms, a pair of guide twines, each of said guide twines having a first end attached to a release washer interconnected to each of said second ends of said first clamp arms, and said second ends of said guide twines extending through said guide ring and attached to a stop ring, said stop ring having a circumference to prevent passage of said guide ring;

an interconnection cord having a first end interconnected to said stop ring and a second end interconnected to a disengagement pin;

an S-hook assembly comprising:

a) a pair of opposing eye bolts interconnected to said bottom member of said sleeve assembly;

b) a release bolt extending upward through said pair of opposing eye bolts, said release bolt having a head on a lower end with a diameter greater than an internal diameter of said eye bolts, and an upper end releasably interconnectable to said disengagement pin;

c) an S-hook with a first end and a second end, said first end interposed around said release bolt between said first eye bolt and said second eye bolt and said second end extending away from said release bolt;

d) a release wire having a first end and a second end, said first end interconnected to said second end of said S-hook, and said second end interconnected in close proximity to said head of said release bolt; and e) a positioning rope interconnected to said second end of said S-hook, wherein when said first end of said interconnection cord is pulled, said disengagement pin is released from said release bolt, permitting said release bolt to travel through said pair of opposing eye bolts and said S-hook assembly, releasing said positioning rope, S-hook, release wire, release bolt, disengagement pin, interconnection cord, actuation tether, guide tether and release washer from said sleeve assembly.

* * * * *